United States Patent
Pray

[15] 3,684,069
[45] Aug. 15, 1972

[54] HYDRAULIC DISC CLUTCH

[72] Inventor: Lawrence H. Pray, 35296 Malibu, Sterling Heights, Mich. 48077

[22] Filed: Oct. 22, 1970

[21] Appl. No.: 82,944

[52] U.S. Cl.............192/85 CA, 92/158, 192/110 B
[51] Int. Cl...........................................F16d 25/08
[58] Field of Search.............192/85 CA, 91 A, 18 A

[56] References Cited

UNITED STATES PATENTS

| 3,444,971 | 5/1969 | Davidson | 192/85 CA |
| 3,429,410 | 2/1969 | Hansen | 192/85 CA |

FOREIGN PATENTS OR APPLICATIONS

| 213,165 | 1/1961 | Austria | 192/85 CA |
| 130,830 | 2/1951 | Sweden | 192/85 CA |

*Primary Examiner*—Benjamin W. Wyche
*Attorney*—Whittemore, Hulbert & Belknap

[57] ABSTRACT

A fixed annular hydraulic cylinder slidably receives an annular piston of a special, generally Z-shaped cross-section, which pilots at one of its parallel legs on a horizontal shoulder portion of the cylinder. The other piston leg serves as a positioning pilot surface for an annular needle bearing transmitting axial thrust to a pressure plate of a disc clutch stack. A large projected annular are of the piston is engaged by the needle bearing for high torque capacity, and a large diameter radial and axial thrust-sustaining ball bearing journals a driver hub of the clutch within the latter's cylinder portion, at the axial side of the piston opposite the needle bearing.

3 Claims, 2 Drawing Figures

PATENTED AUG 15 1972 3,684,069

INVENTOR
LAWRENCE H. PRAY
BY Whiteman Hulbert
Belknap
ATTORNEYS

HYDRAULIC DISC CLUTCH

CROSS-REFERENCE TO RELATED APPLICATION

My co-pending applications, Ser. No. 825,567, filed May 19, 1969, now abandoned, and continuation application Serial No. 82,115 show and describe a hydraulic clutch generally comparable in structure and function to the present clutch.

BACKGROUND OF THE INVENTION

1. Field of the Invention

The invention has application in the fluid-pressure operated fixed cylinder type clutch field, in particular in torque transmission installations in which great load bearing capacity and length of life can be offered in a clutch of very compact form.

2. Description of the Prior Art

Hansen U.S. Pat. No. 3,011,608 of Dec. 5, 1961, discloses a generally similar type of hydraulic unit. Hansen U.S. Pat. No. 3,429,410 of Feb. 25, 1969 and Davidson U.S. Pat. No. 3,444,971 of May 20, 1969 also relate to hydraulically operated disc clutches employing an axial thrust needle bearing, but in each case the relationship of bearing, cylinder and piston features differs materially from what is herein shown.

SUMMARY OF THE INVENTION

The improved clutch incorporates an annular hydraulically powered, rotatively and axially fixed cylinder having an annular, axially acting piston therein which releasably compresses a stack of clutch discs to drivingly couple an output member with a co-axial input member hub. The input hub is journalled for rotation in the cylinder structure through the agency of a large size radial and axial thrust sustaining ball bearing; and clutch engaging axial thrust is exerted by the piston on the clutch disc stack through the agency of a large diameter needle bearing spaced radially well outwardly of a driving hub representing the power input member. Moreover, the piston projects a large annular radial area subject to the hydraulic actuating pressure for high torque capacity.

The circular radial zone of the needle bearing unit substantially coincides with a corresponding circular zone of overlap of alternate discs of the friction disc stack; and the needle bearing is precisely positioned in this radial zone by having its inner diameter piloted positively on an adjacent cylindrical shoulder formation of the power piston. Thus a very strong axial clutch-engaging thrust may be transmitted to the disc stack in a very stable distributed manner.

The piston has means for the hydraulic power liquid lubrication of the needle bearing; and an improved Z-shaped cross sectional outline of the piston not only provides the pilot shoulder surface for the needle bearing, but also enables the cylinder to afford a large space for the reception of the large diameter ball bearing.

Thus a clutch of given prescribed diameter limit may incorporate the largest possible ball bearing, for increased bearing life. This also permits the use of maximum size hub bores for improved shaft stiffness and rigidity.

DESCRIPTION OF A PREFERRED EMBODIMENT

Figures 1, 2:
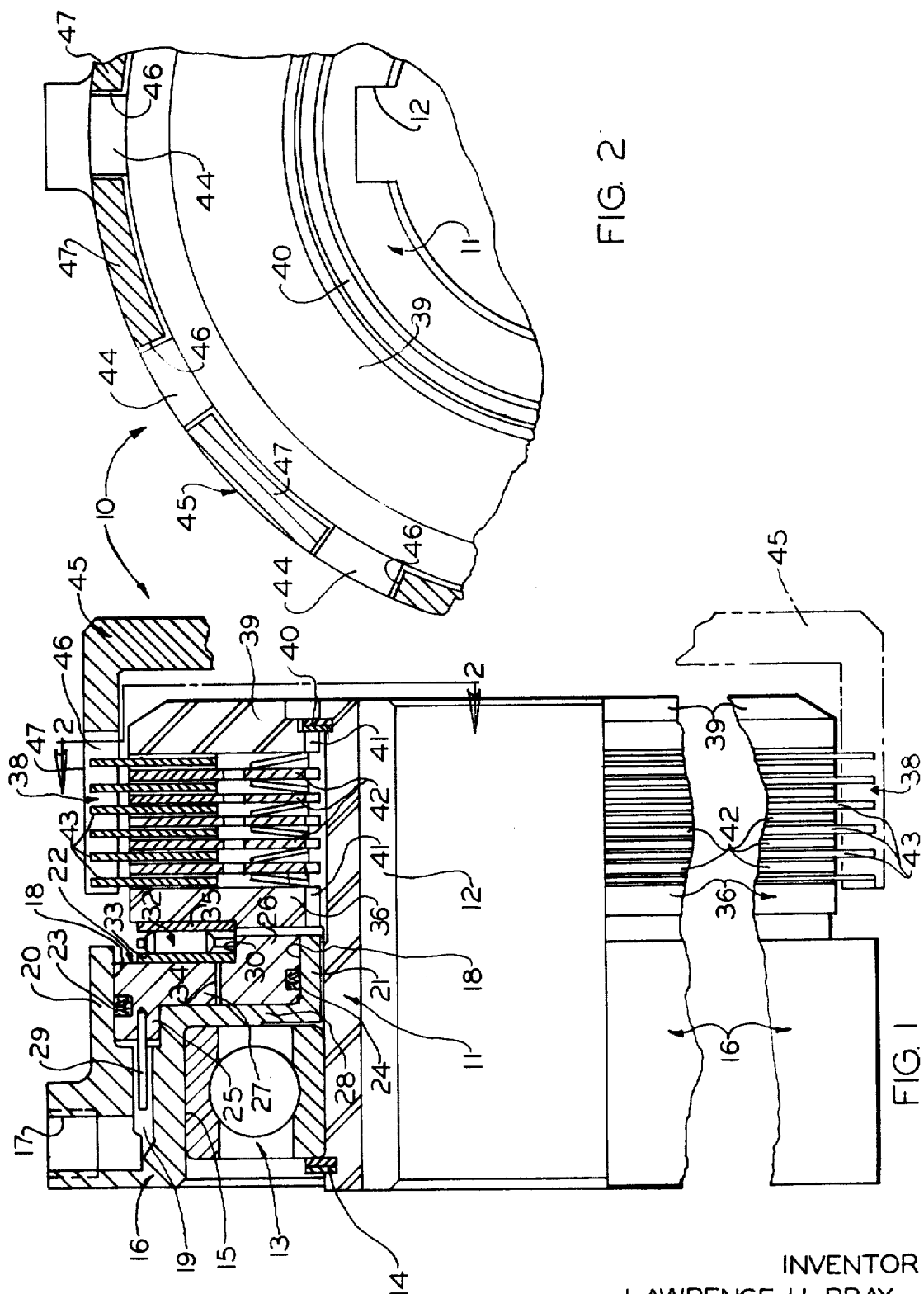
FIG. 1 is a fragmentary view in section in a plane including the axis of the clutch.
FIG. 2 is a fragmentary view in transverse section on broken line 2—2 of FIG. 1.

The clutch 10 of the invention, comprises an input or driving hub 11 which is internally keyed at 12 to be rotatively operated by an appropriate drive shaft (not shown). This hub is rotatably journalled by a very rugged radial and axial thrust sustaining ball bearing 13, the inner race of which, as it rotates with hub 11, bearing against an axial restraining snap ring-type abutment 14 seated in hub 11. The outer race of bearing 13 is fixedly received in a large diameter annular recess 15 of rectangular cross-section, which recess is formed in and opens outwardly of one axial side of a fixed hydraulic power cylinder part 16 of clutch 10. This part is suitably restrained in any desired manner against rotation; the cylinder thus serving as a stable radial bearing support for the driver hub 11. Cylinder member 16 has a radial boss provided with a hydraulic pressure liquid intake port 17, and is formed on its side opposite bearing 13 to provide an annular cylinder space 18 of special shape intermediate its radial limits.

The space 18 is communicated with the intake port 17 by an axial pressure passage 19 in part 16 which is of generous bore size, the space 18 being in part defined by cylindrical, radially spaced and coaxial outer and inner walls 20, 21, respectively integral with the cylinder part. These slidably guide an annular power piston 22, also of special cross section, and annular packings 23 and 24 on the piston respectively seal the latter in relation to the parallel cylinder walls 20 and 21.

As indicated above, the piston 22 is of generally Z-shaped cross-section, characterized by parallel, radially outer and inner cylindrical leg portions 25, 26 on which the respective packings 23, 24 are carried, and an integral connecting body portion 27 of considerable radial length. This lies adjacent and parallel to a radially extending cylinder wall 28 of equal length, which connects the inner axial cylinder wall 21 with the portion of cylinder part 16 in which the pressure inlet port 17 and passage 19 are formed.

The radially outer axial leg at of piston pilots slidably on cylinder part 16 atop the latters radial wall 28,and carries an axially extending pin 29 which is received with good clearance, and for a substantial axial depth, in the cylinder inlet passage 19. Pin 29 thus prevents an undue possible rotation of piston 22 in the fixed cylinder space, yet leaves ample passage space for the pressure liquid.

It is seen that the Z-shaped contouring of piston 22 and the cylinder walls radially within the latter affords a large volume in space 15 to receive the ball bearing 13, enabling the latter to be selected in a maximum size consistent with the overall o.d. limitation on the clutch 10, hence guaranteeing a long bearing life under substantial load, also great shaft rigidity.

The radially inner axial leg 26 presents an outer cylindrical surface 30 on which a needle bearing 32 is piloted at its inner diameter, thus insuring a precisely maintained location of this bearing in relation to piston 22 and the remainder of the clutch structure.

A left-hand race 33 (FIG. 1) of bearing 32 abuts the radial cylinder wall 28, which has a small through opening 34 for admission to the needle bearing of hydraulic pressure fluid from the cylinder space to lubricate bearing 32. The right-hand race 35 abuts to the right an annular pressure plate 36 of a clutch disc stack, generally designated 38, the race 35 being piloted on a small cylindrical shoulder on plate 36 coinciding axially with the bearing pilot shoulder 30 on piston 22.

It is seen by reference to FIG. 1 that the radial wall 28 of the piston presents, in addition to the portion of its leg 25 directly exposed to pressure passage 19, a large annular radial area on its left which is also subject to fluid pressure actuation; and this endows the clutch 10 with a high torque capacity. It is also seen that the piston shoulder 30 pilots the needle bearing 32 in an annular pressure zone which has a large radial spacing from the axis of the clutch.

In addition to its annular pressure plate 36, the clutch stack 38 comprises an axially spaced backing plate 39 rearwardly abutting a snap-type restraining ring 40 on drive hub 11, both of the plates 36, 39 having radially inner spline formations 41 keying the same for rotation with the hub. Alternate, radially inner friction discs 42 of the stack 38 also have spline connections to the hub. A radially outer set of friction discs 43 alternate with the discs, 42 being drivingly spline-connected by ears 44 at their outer periphery (FIG. 2) to an annular, cup-like output or driven member 45, the ears 44 taking into axially extending openings 46 defined between fingers 47 of member 45. A series of Belleville springs 48 are alternately positioned between pressure plate 36, clutch discs 42, 43 and backing plate 39 of the stack 38, operating in a known manner to spread these members relative to one another when the clutch 10 is in non-clutching condition, i.e., when piston 22 is not subject to hydraulic pressure.

As in the case of my co-pending application identified above, the considerable radial size of needle bearing 32 enables its circular center median zone to be brought into axial coincidence with an approximate common radial circular center line or common annular median zone of the piston 22, the pressure plate 36, the projected area of overlap of friction discs 42, 43 and the backing plate 39. These zones also align axially with a large area annular pressure actuated radial wall zone of the piston 20, hence heavy axial forces involved in the compacting of the disc stack 38 are stably borne and transmitted.

What is claimed is:

1. A fluid pressure operated clutch, comprising a fixed cylinder part providing a pressure space defined in part by parallel, radially spaced axial wall portions connected by a radial wall portion, from which radial portion the axial portions extend in opposite directions, a piston slidable in said pressure space, said piston having radially spaced axial portions extending in opposite axial directions, which piston portions are connected by a radial portion, being slidably engaged with said respective axial wall portions of the cylinder pressure space, a clutch unit releasably compressible axially by said piston under fluid pressure in said space, an annular bearing transmitting compressive force between said piston and clutch unit, said bearing being axially piloted on one of said axial piston portions and axially abutting said radial piston portion, and another annular bearing disposed in a space of said cylinder part on the axial side of said radial wall portion of the cylinder part opposite the piston, said cylinder part having an axially extending pressure passage to said pressure space located radially outwardly of said other bearing and the space receiving the latter, said first named bearing being a needle bearing and said other bearing being a ball bearing, the radially outermost of said axial piston portions having a pin element extending axially into said pressure passage of said cylinder part to oppose rotation of the piston relative to said part.

2. The clutch of claim 1, in which said clutch unit comprises axially alternating annular members radially overlapped in an annular radial zone common to said needle bearing and said radial portions of the piston and cylinder part.

3. The clutch of claim 1, in which said radial portion of said piston has a passage located radially inwardly of said pin element and communicating said pressure space with a space occupied by said needle bearing.

* * * * *

UNITED STATES PATENT OFFICE
CERTIFICATE OF CORRECTION

Patent No. 3,684,069          Dated August 15, 1972

Inventor(s) Lawrence H. Pray

It is certified that error appears in the above-identified patent and that said Letters Patent are hereby corrected as shown below:

Show assignment of Letters Patent from Inventor to Formsprag Company, of Warren, Michigan.

Signed and sealed this 13th day of March 1973.

(SEAL)
Attest:

EDWARD M. FLETCHER, JR.
Attesting Officer

ROBERT GOTTSCHALK
Commissioner of Patents